(12) United States Patent
Yanai et al.

(10) Patent No.: US 9,246,576 B2
(45) Date of Patent: Jan. 26, 2016

(54) APPARATUS AND METHODS FOR DYNAMIC SPECTRUM ALLOCATION IN SATELLITE COMMUNICATIONS

(75) Inventors: Yossef Yanai, Holon (IL); Ehud Levy, Rosh-Ha'ayin (IL)

(73) Assignee: ELTA SYSTEMS LTD., Ashdod (IL)

( * ) Notice: Subject to any disclaimer, the term of this patent is extended or adjusted under 35 U.S.C. 154(b) by 41 days.

(21) Appl. No.: 14/004,188

(22) PCT Filed: Mar. 5, 2012

(86) PCT No.: PCT/IL2012/050074
§ 371 (c)(1),
(2), (4) Date: Nov. 6, 2013

(87) PCT Pub. No.: WO2012/120511
PCT Pub. Date: Sep. 13, 2012

(65) Prior Publication Data
US 2014/0087724 A1    Mar. 27, 2014

(30) Foreign Application Priority Data

Mar. 10, 2011    (IL) .......................................... 211663

(51) Int. Cl.
*H04B 7/185* (2006.01)
*H04W 72/04* (2009.01)
*H04W 84/06* (2009.01)

(52) U.S. Cl.
CPC .......... *H04B 7/18543* (2013.01); *H04B 7/1858* (2013.01); *H04W 72/0453* (2013.01); *H04W 84/06* (2013.01)

(58) Field of Classification Search
None
See application file for complete search history.

(56) References Cited

U.S. PATENT DOCUMENTS

| 5,724,659 | A   |   | 3/1998  | Daniel et al.           |
|-----------|-----|---|---------|-------------------------|
| 5,959,999 | A   | * | 9/1999  | An ................. 370/442 |
| 6,021,309 | A   | * | 2/2000  | Sherman et al. ........ 455/12.1 |
| 6,041,233 | A   | * | 3/2000  | Rosati ............... 455/427 |
| 6,366,761 | B1  | * | 4/2002  | Montpetit ............ 455/12.1 |
| 6,385,434 | B1  | * | 5/2002  | Chuprun et al. ........ 455/11.1 |
| 6,711,398 | B1  | * | 3/2004  | Talaie et al. .......... 455/403 |
| 7,440,517 | B1  | * | 10/2008 | Henne et al. .......... 375/324 |
| 8,364,186 | B2  | * | 1/2013  | Agarwal .............. 455/509 |

(Continued)

FOREIGN PATENT DOCUMENTS

WO    WO 96/06490    2/1996

OTHER PUBLICATIONS

"Communications satellite;" from Wikipedia; http://en.wikipedia.org/w/index.php?title=Communications_satellite&oldid=417400282.

(Continued)

*Primary Examiner* — Kimberly A Williams
(74) *Attorney, Agent, or Firm* — Oliff PLC

(57) ABSTRACT

A communication system including Satellite Communication apparatus providing communication services to at least a first set of communicants, the first set of communicants including a first plurality of communicants, wherein the communication services are provided to each of the communicants in accordance with a spectrum allocation corresponding thereto, thereby to define a first plurality of spectrum allocations apportioning a first predefined spectrum portion among the first set of communicants; and Dynamic Spectrum Allocations apparatus operative to dynamically modify at least one spectrum allocation corresponding to at least one of the first plurality of communicants without exceeding the spectrum portion.

25 Claims, 3 Drawing Sheets

(56) References Cited

U.S. PATENT DOCUMENTS

| | | |
|---|---|---|
| 2003/0065823 A1 | 4/2003 | Kim |
| 2003/0096610 A1* | 5/2003 | Courtney et al. ............. 455/429 |
| 2003/0166401 A1* | 9/2003 | Combes et al. ............... 455/427 |
| 2004/0072539 A1* | 4/2004 | Monte et al. ................. 455/13.4 |
| 2004/0107281 A1* | 6/2004 | Bose et al. ................... 709/226 |
| 2005/0198677 A1 | 9/2005 | Lewis |
| 2005/0260948 A1* | 11/2005 | Regulinski et al. .......... 455/12.1 |
| 2006/0068798 A1* | 3/2006 | Reddi ............................ 455/446 |
| 2006/0155840 A1* | 7/2006 | Giffin et al. .................. 709/224 |
| 2006/0205367 A1* | 9/2006 | Karabinis ...................... 455/95 |
| 2007/0060058 A1* | 3/2007 | Shattil .......................... 455/63.1 |
| 2007/0184778 A1* | 8/2007 | Mechaley .................... 455/12.1 |
| 2008/0109343 A1 | 5/2008 | Robinson et al. |
| 2009/0017850 A1 | 1/2009 | Jovicic et al. |
| 2009/0034448 A1* | 2/2009 | Miller et al. .................. 370/316 |
| 2009/0191813 A1* | 7/2009 | Abedi ............................ 455/62 |
| 2009/0196180 A1* | 8/2009 | Bahl et al. ..................... 370/235 |
| 2010/0150037 A1* | 6/2010 | Becker et al. ................. 370/401 |
| 2010/0315949 A1 | 12/2010 | Agarwal |
| 2014/0307635 A1* | 10/2014 | Agrawal et al. ............... 370/329 |

OTHER PUBLICATIONS

"Satellite radio;" from Wikipedia; http://en.wikipedia.org/w/index.php?title=Satellite_radio&oldid=418138861.

"Amateur radio;" from Wikipedia; http://en.wikipedia.org/w/index.php?title=Amateur_radio&oldid=416105880.

"Satellite Internet access;" from Wikipedia; http://en.wikipedia.org/w/index.php?title=Satellite_Internet_access&oldid=416884805.

* cited by examiner

APPARATUS AND METHODS FOR DYNAMIC SPECTRUM ALLOCATION IN SATELLITE COMMUNICATIONS

REFERENCE TO CO-PENDING APPLICATIONS

This application claims priority from Israel Patent Application No. 211663 "Apparatus and methods for dynamic spectrum allocation in satellite communications", filed 10 Mar. 2011.

FIELD OF THE INVENTION

The present invention relates generally to communications and more particularly to satellite communications.

BACKGROUND OF THE INVENTION

According to Wikipedia, SATCOM (Satellite Communications) is a generic term for a technology which affords mobile telephony via satellite [e.g., aircraft and watercraft]. A communications satellite (sometimes abbreviated to COMSAT) is an artificial satellite stationed in space for the purpose of telecommunications. For fixed (point-to-point) services, communications satellites provide a microwave radio relay technology complementary to that of submarine communication cables. They are also used for mobile applications such as communications to ships, vehicles, planes and hand-held terminals, and for TV and radio broadcasting applications, for which other technologies, such as cable, are impractical or impossible.

Full-mesh satellite communications at Ka-band is known, in which a full-duplex mesh connection streams high-definition video simultaneously in both directions between remote sites.

Dynamic Spectrum Allocation In Cellular Communications Systems is known. Conventional Satellite Communications systems allocate their spectrums statically to their users.

The disclosures of publications and patent documents, if any, mentioned in the specification, and of the publications and patent documents cited therein directly or indirectly, are hereby incorporated by reference.

SUMMARY OF THE INVENTION

Certain embodiments of the present invention seek to provide dynamic spectrum allocation in satellite communications. Users to which spectrum is allocated are also termed herein "communicants".

Conventional current KU band SATCOM architectures for airborne applications, where there are limitations on swept volume and antenna size, include 2 topologies:

a. The first topology is a star or MESH SATCOM network. This topology is considered an optimal solution for applications which require low or medium data rate (up to few hundred Kbps) to be used in Inbound communications by large quantities of users. In this type of application, channel resources are limited and the network management system divides the channel resources using prioritization mechanism or QOS (quality of service) mechanisms.

The accumulation of the recourses, driven by the number of users working simultaneously, and the throughput they require, drives the spectrum which is leased in the transponder from the satellite operator.

b. The second topology is based on the PTP protocol, which uses SCPC (Single channel per carrier) waveform and is required in high throughput applications (e.g. at least a few Mbps). This type of waveform is the most efficient in which no network overhead is required and the entire spectrum is assigned to a single application.

Certain embodiments of the present invention seek to provide a new architecture which utilizes some or all of the following technologies: dynamic spectrum management, ACM/VCM technology and SIC technology.

Certain embodiments of the present invention seek to provide a new architecture which combines the advantages of both of the existing topologies described above, by taking applications requiring high throughput and separating the command and control information, which typically has a low data rate, and separate this information from the payload information which typically has a high data rate.

Typically, the system is CDMA in its nature in that several transmitters send information simultaneously over a single physical communication channel, and a special coding scheme, in which each transmitter is assigned a code, allows multiple users to be multiplexed over the channel In contrast, alternative schemes such as TDMA or FDMA divide access to the channel by time or frequency respectively.

The conventional star topology's current architecture may be extended to support more users working simultaneously. Due to the CDMA nature of the system this extension may be based on SIC technology implemented to the CDMA waveform; communicants (also termed herein "users") which up to now have used PTP protocols hence consumed large amounts of spectrum, may instead be part of the star network (thereby releasing spectrum resources for PTP users) e.g. by joining the network with the command and control channels.

According to certain embodiments, a SIC Receiver is used to overcome the limit of number of users operating simultaneously in a CDMA system. Different users in the CDMA system may be distinguished between using cross correlations mechanisms of the signals coming into the receiver. Optimal decoding occurs e.g. when the signals are received with the same levels. The signals may be decoded with a long sequence with orthogonal sequences. In practice, the received signals may enter at different power levels and sometimes low level signals are hidden and cannot be decoded.

The number of users to be distinguished typically depends on the power level and length of the sequence. To the extent the power difference between users is minimized, so the system is able to distinguish between users.

Use of an SIC receiver is particularly advantageous when the transmitted signal's nature is well known to the receiver or can be estimated; in this case the receiver can cancel the strong well known signal, maintain all signals at the same level and decode them. After eliminating the strong signal it is possible to decode the remaining weak signals, and in parallel, decode the strong signals. This in-parallel decoding of weak and strong users allows the system to support a relatively large number of users.

As a result, all the users are part of a command and control network. If there are requirements to use high data rate, the network manager may then assign a new spectrum to the relevant user and the relevant user may use instantaneous SCPC waveform to transmit the payload data.

This solution is spectrally efficient and tailored for different types of mission regimes and is specifically suitable for missions using payload with high throughput transmissions in a large duty cycle; and is also efficient for missions using continuous operations of payload transmission.

In order to prevent the system from using 2 waveforms simultaneously all the control information may be mixed in the SCPC (Single channel per carrier) waveform, when payload transmissions are used.

Dynamic allocation of spectrum may be achieved by using ACM/VCM technology which allows spectrum minimization on demand. Spectrum allocation may be effected by a dynamic resource management system.

In accordance with an aspect of the presently disclosed subject matter, there is provided a communication system comprising a satellite communication apparatus providing communication services to at least a first set of communicants, the first set of communicants including a first plurality of communicants, wherein the communication services are provided to each of the communicants in accordance with a spectrum allocation corresponding thereto, thereby to define a first plurality of spectrum allocations apportioning a first predefined spectrum portion among the first set of communicants; and a Dynamic Spectrum Allocation apparatus operative to dynamically modify at least one spectrum allocation corresponding to at least one of the first plurality of communicants without exceeding the spectrum portion.

In accordance with an embodiment of the presently disclosed subject matter, there is provided a system wherein the first plurality of communicants comprises at least one mobile vehicle equipped with apparatus for mobile telephone via satellite.

In accordance with an embodiment of the presently disclosed subject matter, there is further provided a system wherein the communication services include provision of at least one narrow-band communication dedicated channel to at least one of the first plurality of communicants and wherein the Dynamic Spectrum Allocation apparatus is operative to dynamically provide use of the narrow-band communication dedicated channel to at least one of the first plurality of communicants.

In accordance with an embodiment of the presently disclosed subject matter, there is still further provided a system wherein the communication services include provision of at least one video channel to at least one of the first plurality of communicants and wherein the Dynamic Spectrum Allocation apparatus is operative to dynamically provide use of the video channel to at least one of the first plurality of communicants.

In accordance with an embodiment of the presently disclosed subject matter, there is still further provided a system wherein the communication services include provision of a Dynamic Spectrum Allocation control channel to at least one of the first plurality of communicants and wherein said Dynamic Spectrum Allocation apparatus is operative to receive, over the control channel, and recognize, at least one request from at least one individual communicant from among the first plurality of communicants for a dynamic modification of the individual communicant's current spectrum allocation.

In accordance with an embodiment of the presently disclosed subject matter, there is still further provided a system wherein the Dynamic Spectrum Allocation control channel is a portion of an additional channel which is utilized in accordance with a protocol and the protocol supports recognition of the request for a dynamic modification of a current spectrum allocation.

In accordance with an embodiment of the presently disclosed subject matter, there is still further provided a system wherein the additional channel comprises at least one of: an audio channel, a video channel; and a control channel.

In accordance with an aspect of the presently disclosed subject matter, there is still further provided a method for providing communication comprising providing a satellite communication apparatus providing communication services to at least a first set of communicants, the first set of communicants including a first plurality of communicants, wherein the communication services are provided to each of the communicants in accordance with a spectrum allocation corresponding thereto, thereby to define a first plurality of spectrum allocations apportioning a first predefined spectrum portion among the first set of communicants; and providing a Dynamic Spectrum Allocation apparatus operative to dynamically modify at least one spectrum allocation corresponding to at least one of the first plurality of communicants without exceeding the spectrum portion.

In accordance with an embodiment of the presently disclosed subject matter, there is still further provided a method wherein the communication services include provision of a Dynamic Spectrum Allocation control channel to at least one of the first plurality of communicants and wherein the Dynamic Spectrum Allocation apparatus is operative to receive, over the control channel, and recognize, at least one request from at least one individual communicant from among the first plurality of communicants for a dynamic modification of the individual communicant's current spectrum allocation.

In accordance with an embodiment of the presently disclosed subject matter, there is still further provided a method wherein the Dynamic Spectrum Allocation control channel is a portion of an additional channel which is utilized in accordance with a protocol and the method includes modifying the protocol to support recognition of the request for a dynamic modification of a current spectrum allocation.

In accordance with an embodiment of the presently disclosed subject matter, there is still further provided a system wherein the Dynamic Spectrum Allocation apparatus comprises a dynamic resources management system.

In accordance with an embodiment of the presently disclosed subject matter, there is still further provided a system wherein ACM/VCM technology is used to provide spectrum minimization on demand.

In accordance with an embodiment of the presently disclosed subject matter, there is still further provided a system having an architecture which, relative to a star topology's architecture, supports more users working simultaneously, using SIC technology.

In accordance with an embodiment of the presently disclosed subject matter, there is still further provided a system wherein frequency cancellation technology is used to ensure that inbound and outbound bandwidths are generally equal thereby to decrease the frequency bandwidth used.

In accordance with an embodiment of the presently disclosed subject matter, there is still further provided a system wherein waveforms are switched "on the fly".

In accordance with an embodiment of the presently disclosed subject matter, there is still further provided a system wherein at least one of the first plurality of communicants, rather than using PTP protocols hence consuming large portions of the spectrum, instead become part of a communication network by joining the network via at least one command and control channel.

In accordance with an embodiment of the presently disclosed subject matter, there is still further provided a system wherein at least one high data rate-requesting user uses an instantaneous SCPC waveform to transmit at least one payload.

In accordance with an embodiment of the presently disclosed subject matter, there is still further provided a method comprising using the Dynamic Spectrum Allocation apparatus and the Satellite Communication apparatus for a satellite telephone application.

In accordance with an embodiment of the presently disclosed subject matter, there is still further provided a method comprising using the Dynamic Spectrum Allocation apparatus and the Satellite Communication apparatus for a satellite television application.

In accordance with an embodiment of the presently disclosed subject matter, there is still further provided a method comprising using the Dynamic Spectrum Allocation apparatus and the Satellite Communication apparatus for a mobile satellite application.

In accordance with an embodiment of the presently disclosed subject matter, there is still further provided a method comprising using the Dynamic Spectrum Allocation apparatus and the Satellite Communication apparatus for a satellite radio application.

In accordance with an embodiment of the presently disclosed subject matter, there is still further provided a method comprising using the Dynamic Spectrum Allocation apparatus and the Satellite Communication apparatus for an amateur radio application.

In accordance with an embodiment of the presently disclosed subject matter, there is still further provided a method comprising using the Dynamic Spectrum Allocation apparatus and the Satellite Communication apparatus for a satellite Internet application.

In accordance with an embodiment of the presently disclosed subject matter, there is still further provided a method wherein the additional channel comprises at least one of an audio channel, a video channel; and a control channel.

In accordance with an embodiment of the presently disclosed subject matter, there is still further provided a system wherein the at least first set of communicants includes at least first and second sets of communicants, the second set of communicants including a second plurality of communicants, wherein the communication services are provided to each of the second set of communicants in accordance with a spectrum allocation corresponding thereto, thereby to define a second plurality of spectrum allocations apportioning a second predefined spectrum portion among the second set of communicants, and wherein the dynamic spectrum allocation apparatus is also operative to dynamically modify at least one spectrum allocation corresponding to at least one of the second plurality of communicants without exceeding the spectrum portion.

In accordance with an embodiment of the presently disclosed subject matter, there is still further provided a system wherein the dynamic spectrum allocation channel is defined as at least one separate channel, allocation within which is independent of allocation within at least one additional channel.

In accordance with an embodiment of the presently disclosed subject matter, there is still further provided a system wherein the additional channel comprises at least one of an audio channel, a video channel and a control channel.

In accordance with an embodiment of the presently disclosed subject matter, there is still further provided a system wherein the narrow-band communication dedicated channel comprises an audio channel.

In accordance with an embodiment of the presently disclosed subject matter, there is still further provided a method wherein the first set of communicants includes communicants which want to share bandwidth such that different communicants can communicate high definition images at different times and wherein the Dynamic Spectrum Allocation apparatus is operative to dynamically modify at least one spectrum allocation corresponding to at least one of the first plurality of communicants without exceeding the spectrum portion, so as to enable different communicants, from among the first set, to communicate high definition images at different times.

In accordance with an embodiment of the presently disclosed subject matter, there is still further provided a system wherein the communication services include provision of at least one Dynamic Spectrum Allocation control channel to at least one of the first and second pluralities of communicants and wherein the Dynamic Spectrum Allocation apparatus is operative to receive, over the control channel, and recognize, at least one request from at least one individual communicant from among the first and second pluralities of communicants for a dynamic modification of the individual communicant's current spectrum allocation.

In accordance with an embodiment of the presently disclosed subject matter, there is still further provided a system wherein the at least one dynamic spectrum allocation channel is defined as at least one separate channel, allocation within which is independent of allocation within at least one additional channel.

In accordance with an embodiment of the presently disclosed subject matter, there is still further provided a system wherein the at least one dynamic spectrum allocation channel is defined as at least first and second separate channels, and wherein the Dynamic Spectrum Allocation apparatus is operative to receive, over the first separate channel, and to recognize at least one request from at least a first communicant from among the first plurality of communicants for a dynamic modification of the first communicant's current spectrum allocation; and to receive, over the second separate channel, and to recognize, at least one request from at least a second communicant from among the second plurality of communicants for a dynamic modification of the second communicant's current spectrum allocation.

In accordance with an embodiment of the presently disclosed subject matter, there is still further provided a system wherein different users operating simultaneously in a CDMA system are distinguished between using cross correlations mechanisms of signals coming into the system receiver.

In accordance with an embodiment of the presently disclosed subject matter, there is still further provided a system wherein a receiver cancels at least one strong well known signal, and subsequently, the remaining weak signals are decoded in parallel with the strong signal, thereby allowing a relatively large number of users to be supported.

In accordance with an aspect of the presently disclosed subject matter, there is still further provided a computer program product, comprising a computer usable medium having a computer readable program code embodied therein, the computer readable program code adapted to be executed to implement any of the methods shown and described herein.

According to certain embodiments, if n users are to be served e.g. by a hub, a strongest signal from among n signals generated by the n users respectively is identified, processed and then cancelled using a interference cancellation receiver; then a next strongest signal from among the n signals is identified, processed and cancelled using a interference cancellation receiver, and so on until all of the n signals have been processed.

According to certain embodiments, the dynamic spectrum allocation apparatus obtains, from each individual user from among a plurality of users associated with a hub, high/low band scheduling information, typically including an indication of an anticipated time window in which wide band width applications are to be employed by the individual user, and wherein said dynamic spectrum allocation apparatus is operative to allocate spectrum such that at least once, a wide band is allocated to a first user within a first time window which the first user has indicated to require a wide bandwidth application, and subsequently, within a second time window, said wide band is allocated to a second user which has indicated that said second time window requires a wide bandwidth application.

According to certain embodiments, the size of spectrum assigned to an individual user is modified dynamically using adaptive coding modulation.

According to certain embodiments, given a transmitted signal having a first bandwidth, signal interference cancellation (SIC) technology is used to perform a bandwidth conversion of each received signal so as to cause a bandwidth of the received signal to operate within the first bandwidth thereby to decrease total bandwidth employed.

Also provided is a computer program product, comprising a typically non-transitory computer usable medium or computer readable storage medium, typically tangible, having a computer readable program code embodied therein, said computer readable program code adapted to be executed to implement any or all of the methods shown and described herein.

It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

DETAILED DESCRIPTION OF CERTAIN EMBODIMENTS

Dynamic spectrum allocation is well known in new radio technologies such as WIMAX and LTE. In satellite communication such architecture does not currently exist although it is clearly advantageous. For example, given a system as follows:

Network architecture requires: 5 MHz
Payload user requires: 4 MHz
High bandwidth task requires: 6 users
At any point during the task only 1 user requires payload.

According to certain embodiments of the present invention, the dynamic spectrum allocation functionality, typically associated with a hub, obtains from users associated with the hub, high/low band scheduling information, typically including a definition of the anticipated time window in which wide band width applications are to be employed, and/or anticipated time window in which only narrow bandwidth applications are to be employed. In certain applications, a plurality of k users such as 6-7 users are all sent to a single high-bandwidth task, however, at any given time, only one of them is actually transmitting high-bandwidth information and others are either preparing to do so or have completed their portion of the task. Therefore, if each such user provides a definition of the anticipated time window in which wide band width applications are to be employed, the required effective bandwidth may, by virtue of dynamic allocation, be reduced by a factor of k.

Then if spectrum allocation is static, the total bandwidth required for a single mission is: 5+4×6=29 MHz. In contrast, if spectrum allocation is dynamic, e.g. as shown and described herein, the total bandwidth required for a single mission is far less: 5+1×4=9 MHz.

Figure 1:
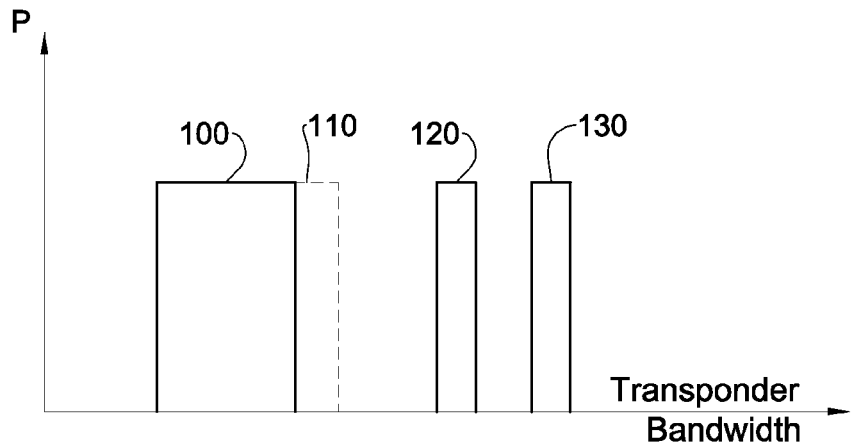
FIG. 1 is a diagram of an example spectrum allocation constructed and operative in accordance with certain embodiments of the present invention.

According to certain embodiments, a SATCOM architecture is provided which enhances spectrum efficiency and lowers the demand for satellite transponder bandwidth required to support high throughput payload missions. Alternatively, only one of these advantages may be provided. The overall efficiency of the system may be increased along some or all of the following dimensions:

The number of supported missions per allocated bandwidth may be increased
Reduction of bandwidth resources when conducting the same mission
Central management of SATCOM users leads to better e.g. optimum use of resources
Adding high throughput mission such as UAVs to the network FIG. 1 is a diagram of an example spectrum allocation constructed and operative in accordance with certain embodiments of the present invention. As shown, the spectrum allocation includes a first spectrum assignment 100 to a control network, a second spectrum assignment 110 dedicated to the dynamic allocation functionalities shown and described herein, and other spectrum assignments 120, 130, . . . assigned to individual communicants on demand.

Examples of dynamic modification of the spectrum allocation of FIG. 1: For example, allocation 120 may be allocated to userA initially, and then dynamically re-allocated later, to userB. Or, allocation 120 may be broadened dynamically, so as to dynamically provide userA with more bandwidth. Or, allocation 130 may be time-shared between several users, e.g. such that between 8 and 10 o'clock (say), allocation 130 is allocated to userA, between 10 and 17 o'clock, allocation 130 is allocated to userB, and between 17 o'clock of today and 8 o'clock of the following day, allocation 130 is allocated to userA.

It is appreciated that the particular proportions shown in FIG. 1, and in other figures, need not necessarily be representative of actual embodiments and are merely shown by way of example.

Figure 2:
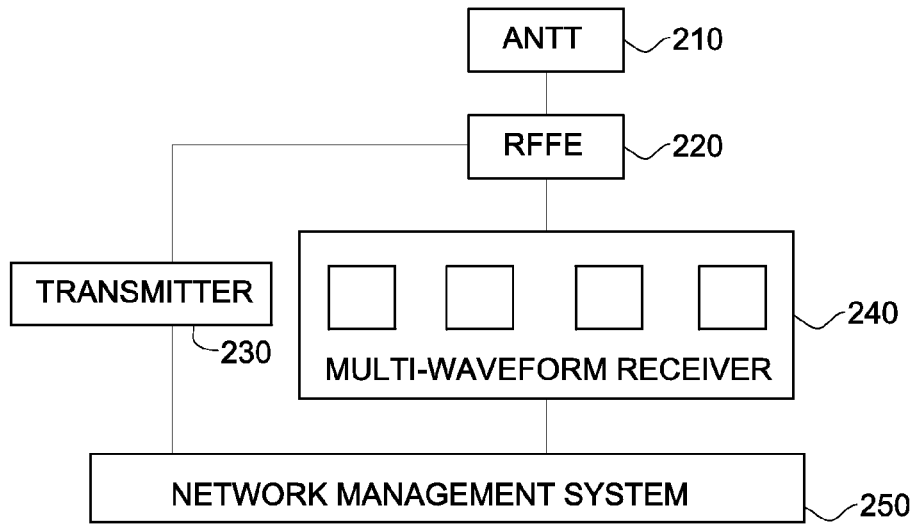
FIG. 2 is a simplified functional block diagram illustration of a ground control station constructed and operative in accordance with certain embodiments of the present invention.

FIG. 2 is a simplified functional block diagram illustration of a ground control station constructed and operative in accordance with certain embodiments of the present invention. As shown, the apparatus of FIG. 2 typically includes some or all of an antenna 210 e.g. a SATCOM slotted array or reflector type antenna, an RFFE (radio frequency front-end) 220 e.g. a SATCOM transceiver, a SATCOM or other transmitter 230, a multi-waveform receiver 240 e.g. a multi-waveform SATCOM receiver, and a SATCOM or other network management system 250.

Figure 3:
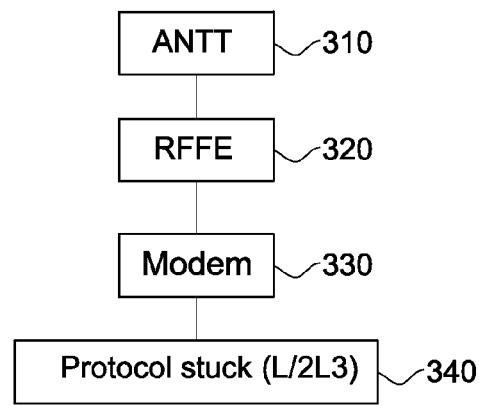
FIG. 3 is a simplified functional block diagram illustration of a satellite communicant constructed and operative in accordance with certain embodiments of the present invention.

FIG. 3 is a simplified functional block diagram illustration of a satellite communicant constructed and operative in accordance with certain embodiments of the present invention. As shown, the apparatus of FIG. 3 typically includes some or all of an ANTT 310, RFFE 320, modem 330 such as a SATCOM modem, and a Protocol stack (L2/L3) 340.

Figure 4:
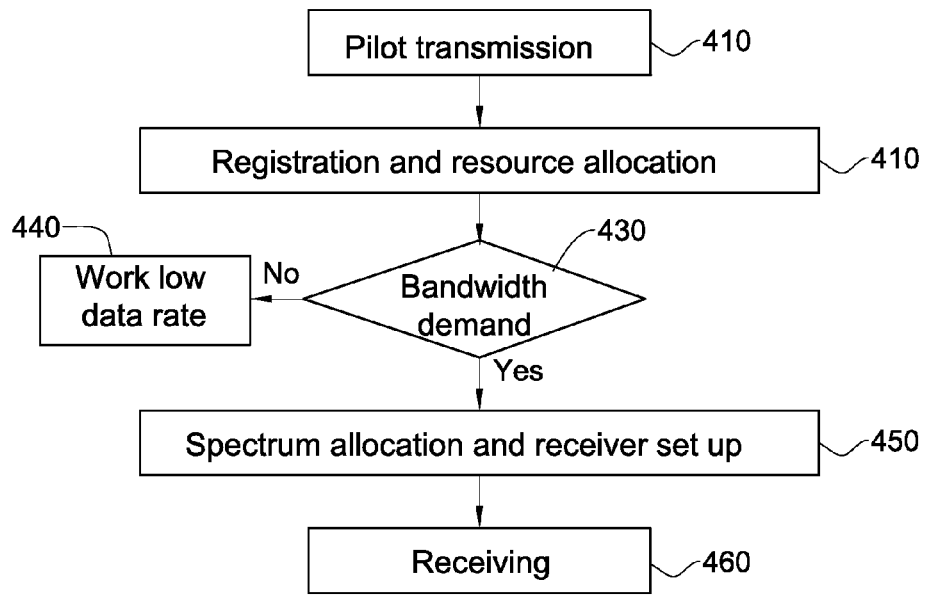
FIG. 4 is a simplified flowchart illustration of a method of operation of the ground control station of FIG. 2, operative in accordance with certain embodiments of the present invention.

FIG. 4 is a simplified flowchart illustration of a method of operation of the ground control station of FIG. 2, operative in accordance with certain embodiments of the present invention. As shown, the method of FIG. 4 typically includes some or all of a Pilot transmission step 410 and a Registration and resource allocation step 420 which typically includes provision of high/low bandwidth scheduling information e.g. as described herein; then if a high Bandwidth demand step, which may be presented even once per minute is refused ("no" option of step 430), work proceeds at low data rate (step 440), whereas if high Bandwidth demand step 430=Yes, Spectrum allocation and receiver set up step 450 is performed, followed by Receiving step 460. Typically, the method checks whether the total requested allocation exceeds available resources and their capabilities; if so, some requests are denied, according to defined priorities and/or rules, whereas if not, all requests may be fulfilled.

Figure 5:
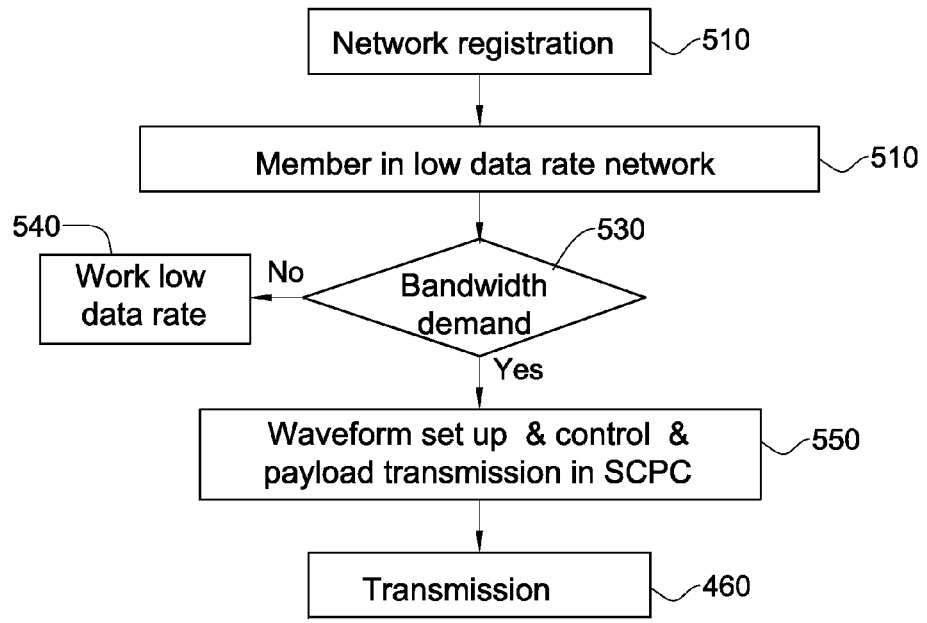
FIG. 5 is a simplified flowchart illustration of a method of operation of the satellite communicant of FIG. 3, operative in accordance with certain embodiments of the present invention.

FIG. 5 is a simplified flowchart illustration of a method of operation of the satellite communicant of FIG. 3, operative in accordance with certain embodiments of the present invention. As shown, the method of FIG. 5 typically includes some or all of a Network registration step 510, a Member in low data rate network step 520; and an if-step 530 in which refusal of a high bandwidth request is shown as a "no" option whereas acquiescence thereto is shown as a "yes" option. Work proceeds at low data rate (step 540) if no, whereas if Bandwidth demand step 530=Yes, a Waveform is set up and control and payload transmission in SCPC is carried out (step 550), followed by Transmission step 560.

Figure 6:
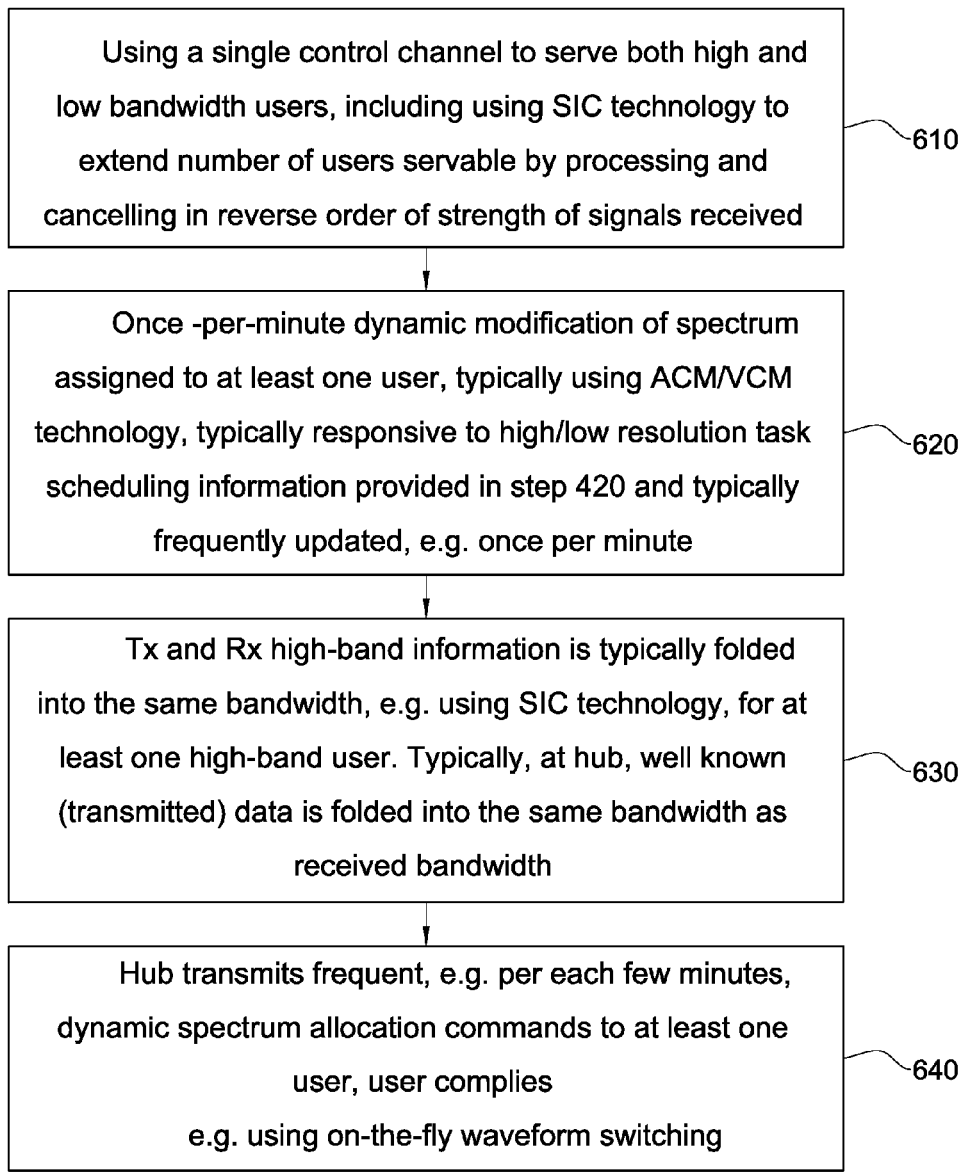
FIG. 6 is a simplified flowchart illustration of an example method which may serve as an implementation of the dynamic spectrum allocation step of FIG. 4 and of the corresponding operation of the hub and associated users.

FIG. 6 is a simplified flowchart illustration of an example method which may serve as an implementation of step 450 of FIG. 4 and corresponding operation of the hub and associated users. The method of FIG. 6 may include some or all of the following steps, suitably ordered e.g. as shown:

Step 610: using a single control channel to serve both high and low bandwidth users, including using SIC technology to extend number of users servable by processing and cancelling in reverse order of strength of signals received Step 620: once-per-minute dynamic modification of spectrum assigned to at least one user, typically using ACM/VCM technology, typically responsive to high/low resolution task scheduling information provided in step 420 and typically frequently updated, e.g. once per minute.

Step 630: Tx and Rx high-band information is typically folded into the same bandwidth, e.g. using SIC technology, for at least one high-band user. Typically, low data rate information is transmitted from the hub to the users and occupies certain bandwidth and data from the user is transmitted to the hub and occupies certain bandwidth. At the hub well known (transmitted) data is folded into the same bandwidth as the received bandwidth thereby reducing bandwidth assigned to the transmitted signal.

Step 640: hub transmits frequent, e.g. per each few minutes, dynamic spectrum allocation commands to at least one user, user complies using on-the-fly waveform switching.

Since the network is CDMA in its nature, use of medium data rate with a large quantity of users may be facilitated by using SIC-based technology employing an interference cancellation receiver. For example, if there are n users, such as 24 users, the strongest signal from among the n signals generated by the n users respectively is first identified, and then cancelled using the interference cancellation receiver. The next strongest signal is then identified and cancelled similarly, and so on until all signals have been processed.

Extension of the network to include more users employs more bandwidth, in order to keep the system spectrally efficient in the spectrum. Frequency cancellation technology may be employed to cause the outbound communication to operate at the same bandwidth as the inbound communication, thereby to decrease the frequency bandwidth used.

For applications in which a user switches the waveform from low data rates to high data rates the system may implement a technology for switching waveforms "on the fly" e.g. as described below.

Typically, the system shown and described herein combines any or all of the following characteristics:

a. dynamic spectrum management: Spectrum allocation may be effected by a dynamic resources management system Operative to adjust spectrum allocations as frequently as warranted by the application e.g. once per hour or once per minute.

b. ACM/VCM technology: Use of ACM(adaptive coding modulation)/VCM (variable coding modulation) technology for energy management in satellite applications is known. According to certain embodiments, dynamic spectrum management, too, may be achieved by using ACM/VCM technology which allows spectrum minimization on demand in that the size of spectrum assigned to an individual user may be modified dynamically using adaptive coding modulation.

c. SIC technology: The conventional star topology's current architecture may be extended to support more users working simultaneously. Due to the CDMA nature of the system this extension may be based on SIC technology.

d. use signal interference cancellation (SIC) technology to perform a suitable bandwidth conversion of each received signal so as to cause the bandwidth of the received signal to operate within the same bandwidth as the transmitted signal thereby to decrease the total frequency of bandwidth employed.

e. switching waveforms transmitted e.g. by a transmitter system borne by a vehicle, "on the fly", depending on changing characteristics of currently operating tasks. For example, in those windows of time in which imaging is performed, a first waveform may be employed whereas in those windows of time in which only narrowband communications are being transmitted, a second waveform may be employed. For example, the vehicle-borne transmitter system may include two transmitters each transmitting using a different waveform and the system may switch between them on the fly.

The applications of the improved Satellite Communications system shown and described herein include but are not limited to the following: Telephone, Satellite television, Mobile satellite technologies, Satellite radio, Amateur radio; and Satellite Internet. The above categories of applications may for example include:

Telephone: including but not limited to intercontinental long distance telephony. Typically, according to Wikipedia, a fixed Public Switched Telephone Network relays telephone calls from land line telephones to an earth station, where they are then transmitted to a geostationary satellite. The downlink follows an analogous path. Due to improvements in submarine communications cables, through the use of fiber-optics, use of satellites for fixed telephony in the late 20th century was mostly for locations where no submarine cables are in service or where landline telecommunications are rare to nonexistent, for example large regions of South America, Africa, Canada, China, Russia, and Australia. Satellite phones may connect directly to a constellation of either geostationary or low-earth-orbit satellites. Calls may then be forwarded to a satellite teleport connected to the Public Switched Telephone Network.

Television: Such as but not limited to Direct Broadcast Satellite (DBS), and Fixed Service Satellite (FSS) applications, particularly in North America, and such as or similar to the Astra, Eutelsat, and Hotbird spacecraft in orbit over the European continent. Generally, according to Wikipedia, Fixed Service Satellites use the C band, and the lower portions of the Ku bands. They are normally used for broadcast feeds to and from television networks and local affiliate stations (such as program feeds for network and syndicated programming, live shots, and backhauls), as well as being used for distance learning by schools and universities, business television (BTV), videoconferencing, and general commercial telecommunications. FSS satellites are also used to distribute national cable channels to cable television head-ends. Free-to-air satellite TV channels are also usually distributed on FSS satellites in the Ku band. The Intelsat Americas 5, Galaxy 10R and AMC 3 satellites over North America provide many FTA channels on their Ku band transponders.

Direct broadcast satellite typically includes a communications satellite that transmits to small DBS satellite dishes (usually 18 to 24 inches or 45 to 60 cm in diameter). Direct broadcast satellites generally operate in the upper portion of the microwave Ku band. Operating at lower frequency and lower power than DBS, FSS satellites typically employ a much larger dish for reception (3 to 8 feet (1 to 2.5 m) in diameter for Ku band, and 12 feet (3.6 m) or larger for C band). They use linear polarization for each of the transponders' RF input and output (as opposed to circular polarization used by DBS satellites). star SAT is an example of a conventional satellite TV reception system for satellite TV broadcasting applications.

Mobile satellite technologies: for broadcast to stationary TV receivers, mobile direct broadcast applications using satellite radio systems, for example. According to Wikipedia, special antennas exist for mobile reception of DBS television. Using Global Positioning System (GPS) technology as a reference, these antennas automatically re-aim to the satellite no matter where or how the vehicle (on which the antenna is mounted) is situated. These mobile satellite antennas are useful, for example, in conjunction with recreational vehicles. Such mobile DBS antennas are also used for airborne DirecTV in which passengers can view on-board on LCD screens mounted in the seats.

Satellite radio: According to Wikipedia, such a radio offers audio services in some countries, notably the United States, particularly in areas with low population density. A satellite radio or subscription radio (SR) is a digital radio signal that is broadcast by a communications satellite, which covers a much wider geographical range than terrestrial radio signals. Satellite radio, as opposed to ground-based radio services, may allow listeners to roam across an entire continent, listening to the same audio programming anywhere they go. The antenna employs a clear view to the satellites. In areas where tall buildings, bridges, or even parking garages obscure the signal, repeaters can be placed to make the signal available to listeners. Radio services are usually provided by commercial ventures and are subscription-based. The various services are proprietary signals, using specialized hardware for decoding and playback.

Amateur radio: Typically, according to Wikipedia, operators have access to OSCAR, e.g., satellites that have been designed specifically to carry amateur radio traffic. Most such satellites operate as spaceborne repeaters, and are generally accessed by amateurs equipped with UHF or VHF radio equipment and highly directional antennas such as Yagis or dish antennas. Some satellites also provide data-forwarding services using the AX.25 or similar protocols.

Satellite Internet: Satellite communication technology, according to Wikipedia, may be used as a means to connect to the Internet via broadband data connections. This can be very useful for users who are located in very remote areas, and cannot access a broadband connection.

It is appreciated that terminology such as "mandatory", "required", "need" and "must" refer to implementation choices made within the context of a particular implementation or application described herewithin for clarity and are not intended to be limiting, since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable sub-combination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A communication system operative in conjunction with Satellite Communication apparatus providing communication services to at least a first set of communicants, said first set of communicants including a first plurality of communicants, wherein said communication services are provided to each of said communicants in accordance with a spectrum allocation corresponding thereto, thereby to define a first plurality of spectrum allocations apportioning a first predefined spectrum portion among the first set of communicants;

the system comprising: Dynamic Spectrum Allocation apparatus operative to dynamically modify, once per time period, wherein at least one time period is within an order of magnitude of no more than one minute, at least one spectrum allocation corresponding to at least one of the first plurality of communicants without exceeding said spectrum portion, wherein said first set of communicants includes communicants which want to share bandwidth such that different communicants can communicate high definition images at different tires and wherein said Dynamic Spectrum Allocation apparatus is operative to dynamically modify at least one spectrum allocation corresponding to at least one of the first plurality of communicants without exceeding said spectrum portion, so as to enable different communicants, from among said first set, to communicate high definition images at different times, wherein plurality of communicants are all sent to a single high-bandwidth task, however, at any given time window, only a predetermined number of the communicants need actually to transmit high-band information, and wherein said Dynamic Spectrum Allocation apparatus provides each of said plurality of communicants with an indication of an anticipated time window in which wide band width applications are to be employed, thereby to reduce the required effective bandwidth by a factor of k, by separating command and control information, having a low data rate, from payload information having a high data rate by including all communicants as part of a command and control network and if there are requirements to use high data rate, assigning a new spectrum to a relevant communicant for transmission of payload data including provision of a video channel dynamically for a dynamic modification of the individual communicant's current spectrum allocation.

2. A system according to claim 1 wherein said first plurality of communicants comprises at least one mobile vehicle equipped with apparatus for mobile telephone via satellite.

3. A system according to claim 1 wherein said communication services include provision of at least one narrow-band communication dedicated channel to at least one of the first plurality of communicants and wherein said Dynamic Spectrum Allocation apparatus is operative to dynamically provide use of said narrow-band communication dedicated channel to at least one of the first plurality of communicants.

4. A system according to claim 1 wherein said communication services include provision of at least one video channel to at least one of the first plurality of communicants and wherein said Dynamic Spectrum Allocation apparatus is operative to dynamically provide use of said video channel to at least one of the first plurality of communicants.

5. A system according to claim 1 wherein said communication services include provision of a Dynamic Spectrum Allocation control channel to at least one of the first plurality of communicants and wherein said Dynamic Spectrum Allocation apparatus is operative to receive, over the control channel, and recognize, at least one request from at least one individual communicant from among the first plurality of communicants for a dynamic modification of the individual communicant's current spectrum allocation.

6. A system according to claim 5 wherein said Dynamic Spectrum Allocation control channel is a portion of an additional channel which is utilized in accordance with a protocol and said protocol supports recognition of said request for a dynamic modification of a current spectrum allocation.

7. A system according to claim 1 wherein said Dynamic Spectrum Allocation apparatus comprises a dynamic resources management system.

8. A system according to claim 1 wherein ACM/VCM technology is used to provide spectrum minimization on demand.

9. A system according to claim 1 having an architecture which, relative to a star topology's architecture, supports more users working simultaneously, using SIC technology.

10. A system according to claim 1 wherein frequency cancellation technology is used to ensure that inbound and outbound bandwidths generally overlap thereby to decrease the frequency bandwidth used.

11. A system according to claim 1 wherein said Dynamic Spectrum Allocation apparatus dynamically modifies a spectrum allocation of an individual user and wherein said user is operative to switch at least one waveform accordingly, "on the fly".

12. A system according to claim 1 wherein at least one of the first plurality of communicants, rather than using PTP protocols hence consuming large portions of the spectrum, instead become part of a communication network by joining the network via at least one command and control channel.

13. A system according to claim 12 wherein at least one high data rate-requesting user uses an instantaneous SCPC waveform to transmit at least one payload.

14. A system according to claim 1 wherein at least one Dynamic Spectrum Allocation control channel is provided to at least one of first and second pluralities of communicants and wherein said Dynamic Spectrum Allocation apparatus is operative to receive, over the control channel, and recognize, at least one request from at least one individual communicant from among the first and second pluralities of communicants for a dynamic modification of the individual communicant's current spectrum allocation.

15. A system according to claim 1 wherein the dynamic spectrum allocation apparatus obtains, from each individual user from among a plurality of users associated with a hub, high/low band scheduling information, including at least one of: an indication of an anticipated time window in which wide band width applications are to be employed by the individual user; and an anticipated time window in which only narrow bandwidth applications are to be employed.

16. A system according to claim 1 wherein said dynamic spectrum allocation apparatus is operative to allocate spectrum such that at least once, a wide band is allocated to a first communicant from among said communicants within a first time window which the first communicant has indicated to require a wide bandwidth application, and subsequently, within a second time window, said wide band is allocated to a second communicant from among said communicants which has indicated that said second time window requires a wide bandwidth application.

17. A method for providing communication using Satellite Communication apparatus operative for providing communication services to at least a first set of communicants, said first set of communicants including a first plurality of communicants, the method comprising:
providing communication services to each of said communicants in accordance with a spectrum allocation corresponding thereto, thereby to define a first plurality of spectrum allocations apportioning a first predefined spectrum portion among the first set of communicants; and including
providing Dynamic Spectrum Allocation apparatus operative to dynamically modify, once per time period, wherein at least one time period is within an order of magnitude of no more than one minute, at least one spectrum allocation corresponding to at least one of the first plurality of communicants without exceeding said spectrum portion,
wherein said first set of communicants includes communicants which want to share bandwidth such that different communicants can communicate high definition images at different times and wherein said Dynamic Spectrum Allocation apparatus is operative to dynamically modify at least one spectrum allocation corresponding to at least one of the first plurality of communicants without exceeding said spectrum portion, so as to enable different communicants, from among said first set, to communicate high definition images at different times,
wherein plurality of communicants are all sent to a single high-bandwidth task, however, at any given time window, only a predetermined number of the communicants need actually to transmit high-bandwidth information,
and wherein said Providing Dynamic Spectrum Allocation apparatus includes provision by each of said plurality of communicants of an indication of an anticipated time window in which wide band width applications are to be employed, thereby to reduce the required effective bandwidth by a factor of k, by separating the command and control information, having a low data rate, from payload information having a high data rate by including all communicants as part of a command and control network and if there are requirements to use high data rate, assigning a new spectrum to a relevant communicant for transmission of payload data including provision of a video channel dynamically for a dynamic modification of the individual communicant's current spectrum allocation.

18. A method according to claim 17 wherein said communication services include provision of a Dynamic Spectrum Allocation control channel to at least one of the first plurality of communicants and wherein said Dynamic Spectrum Allocation apparatus is operative to receive, over the control channel, and recognize, at least one request from at least one individual communicant from among the first plurality of communicants for a dynamic modification of the individual communicant's current spectrum allocation.

19. A method according to claim 18 wherein said Dynamic Spectrum Allocation control channel is a portion of an additional channel which is utilized in accordance with a protocol and said method includes modifying said protocol to support recognition of said request for a dynamic modification of a current spectrum allocation.

20. A method according to claim 17 and also comprising using said Dynamic Spectrum Allocation apparatus and said Satellite Communication apparatus for a satellite telephone application.

21. A method according to claim 17 and also comprising using said Dynamic Spectrum Allocation apparatus and said Satellite Communication apparatus for a mobile satellite application.

22. A method according to claim 17 and also comprising using said Dynamic Spectrum Allocation apparatus and said Satellite Communication apparatus for a satellite Internet application.

23. A method according to claim 17 wherein said indication of an anticipated time window comprises high/low band scheduling information, including a definition of the anticipated time window in which wide band width applications are to be employed, and/or an anticipated time window in which only narrow bandwidth applications are to be employed.

24. A method according to claim 17 wherein at any point during the task, only one communicant requires a high-bandwidth payload.

25. A computer program product, comprising a non-transitory tangible computer readable medium having computer readable program code embodied therein, the computer readable program code adapted to be executed to implement a method for providing communication using Satellite Communication apparatus operative for providing communication services to at least a first set of communicants, said first set of communicants including a first plurality of communicants, the method comprising:
providing communication services to each of said communicants in accordance with a spectrum allocation corresponding thereto, thereby to define a first plurality of spectrum allocations apportioning a first predefined spectrum portion among the first set of communicants; and including
providing Dynamic Spectrum Allocation apparatus operative to dynamically modify, once per time period, wherein at least one time period is within an order of magnitude of no more than one minute, at least one spectrum allocation corresponding to at least one of the first plurality of communicants without exceeding said spectrum portion,
wherein said first set of communicants includes communicants which want to share bandwidth such that different communicants can communicate high definition images at different times and wherein said Dynamic Spectrum Allocation apparatus is operative to dynamically modify at least one spectrum allocation corresponding to at least one of the first plurality of communicants without exceeding said spectrum portion, so as to enable different communicants, from among said first set, to communicate high definition images at different times,
wherein plurality of communicants are all sent to a single high-bandwidth task, however, at any given time window, only a predetermined number of the communicants need actually to transmit high-bandwidth information,
and wherein said providing Dynamic Spectrum Allocation apparatus includes provision by each of said plurality of communicants of an indication of an anticipated time window in which wide band width applications are to be employed, thereby to reduce the required effective bandwidth by a factor of k, by separating the command and control information, having a low data rate, from payload information having a high data rate by including all communicants as part of a command and control network and if there are requirements to use high data rate, assigning a new spectrum to a relevant communicant for transmission of payload data including provision of a video channel dynamically for a dynamic modification of the individual communicant's current spectrum allocation.

* * * * *